US006288974B1

(12) United States Patent
Nelson

(10) Patent No.: US 6,288,974 B1
(45) Date of Patent: Sep. 11, 2001

(54) SYSTEM AND METHOD FOR ENHANCING DETECTION OF OBJECTS THROUGH AN OBSCURING MEDIUM

(75) Inventor: Robert S. Nelson, San Diego, CA (US)

(73) Assignee: The United States of Americas as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/281,173

(22) Filed: Mar. 30, 1999

(51) Int. Cl.[7] .......... H04B 1/06

(52) U.S. Cl. .......... 367/135; 367/13; 367/7

(58) Field of Search .......... 367/87, 13, 902, 367/11, 7; 600/407

(56) References Cited

U.S. PATENT DOCUMENTS

| | | |
|---|---|---|
| 3,735,333 | 5/1973 | Balser et al. . |
| 3,893,060 | 7/1975 | Balser . |
| 4,630,246 | 12/1986 | Fogler . |
| 4,719,606 | 1/1988 | Andrieu . |
| 4,811,308 | 3/1989 | Michel . |
| 5,144,592 * | 9/1992 | Bonis .......... 367/87 |
| 5,280,787 | 1/1994 | Wilson et al. . |
| 5,493,273 | 2/1996 | Smurlo et al. . |
| 5,495,427 | 2/1996 | Puma et al. . |
| 5,504,719 | 4/1996 | Jacobs . |

* cited by examiner

*Primary Examiner*—Daniel T. Pihulic
(74) *Attorney, Agent, or Firm*—Harvey Fedelman; Peter A. Lipovsky; Michael A. Kagan

(57) ABSTRACT

A system for detecting an object of interest through a medium such as the atmosphere or ocean employs a reference object from which a reference signal emanates. A detector detects and transforms the reference signal into a transformed reference signal and further detects and transforms an object signal emanating from an object of interest into a transformed object signal. The object signal may be radiated, re-radiated, or scattered from the object of interest. An image processor generates a corrected image signal by applying an image transfer function to convolve the transformed object signal. Then a display presents a corrected image of the object of interest in response to receiving the corrected image signal.

17 Claims, 3 Drawing Sheets

SYSTEM AND METHOD FOR ENHANCING DETECTION OF OBJECTS THROUGH AN OBSCURING MEDIUM

The present invention relates to the field of surveillance of moving objects, and more particularly to a system which uses optical, acoustic or ionizing radiation to detect objects through a medium, and more particularly, for detecting moving objects through an obscuring medium.

BACKGROUND OF THE INVENTION

The detection of moving objects through an obscuring media can be a difficult task, even for advanced electronic imaging systems. Image acquisition by electronic systems is most readily accomplished when the moving object is located in a transparent medium. However, even transparent media can contain sources of signal aberrations that make image acquisition difficult. Obscuring media are media that impede image acquisition due to phenomena such as absorption, scattering, aberration, or boundary effects.

For purposes of detecting and tracking moving objects, electronic imaging systems are generally preferred over other means of image acquisition for several reasons. Electronic imaging systems are not only able to generate images, but also accurately determine one or more of the position, range, bearing and speed of a moving object. Thus electronic systems can track as well as identify the moving object. Another advantage of electronic imaging systems is the ability of electronic systems to digitize the image signal of the object and perform computational processing tasks such as contrast enhancement, smoothing and blending of adjacent image pixels, deconvolution, and subtraction of one image from another.

Electronic imaging systems may not effectively image or track a moving object if the object is moving in an obscuring medium. Certain media obscure the object, that is, make detection difficult. Moving objects located below the ocean surface can be difficult to detect by surface ships and submarines due to natural scatterers, absorbers, and non-uniformities present in sea water and relevant interfaces. Such interfaces may include the surfaces of the moving object or a moving detection system. The atmosphere and relevant boundaries may each be obscuring as well. For electromagnetic radiation that is not highly absorbed or scattered by the atmosphere, obscuration may derive from turbulence. Turbulence can result from natural conditions in the medium as well as from local turbulence introduced by the motion of a moving object or a moving detection system such as would be found, for example, on a torpedo or high speed missile. Natural or man-made turbulence produces refractive index gradients that have the effect of introducing aberrations into the image propagation path and thereby produce distorted and sometimes ambiguous images. Turbulence is most likely to occur near a large area interface between the atmosphere and either land or a body of water such as the sea. For example, mirage images may arise due to intense solar heating of a surface such as a macadam roadway. Heat rising from the roadway heats the air near the interface (boundary layer) to a temperature that exceeds the temperature of the air located several meters above the surface. A refractive index gradient in the terrestrial boundary layer is created that reflects a portion of the incoming solar radiation. The effect appears similar to that of the reflection by a small body of water.

Another area where atmospheric turbulence plays an important role in obscuring images is in the marine boundary layer. The marine boundary layer is the vertical column of air immediately adjacent to the ocean surface. Since ocean water temperatures during the day are typically cooler than air temperatures, the air in the boundary layer is cooled relative to the air several meters above the water. As a result, images of objects located within the marine boundary layer are distorted.

Because of the imaging difficulties associated with objects located near these types of atmospheric interfaces, a moving object is more difficult to detect if it moves close to the surface. This is the case for cruise and sea-skimming missiles for example, which fly at high speed just several feet above the land or sea surface to defeat detection. Such surface-hugging, moving objects are difficult to detect through the turbulent atmosphere. In some cases, observations from satellites or reconnaissance aircraft can detect these objects. The success of such imaging systems is based on the observation axis used by the imaging system relative to the marine or terrestrial boundary layer. That is, the path through the aberration boundary layer is shorter for detection from above the layer than for detectors located at the surface. The latter detectors must collect image data through a longer path length in the boundary layer.

However, imaging from above the boundary layer does not correct for the problems of imaging through an aberrational atmosphere. Further, reliance by a platform located at the surface on an airborne system to provide image and tracking information has numerous inherent risks. One is the potential for unreliable or untimely communication between the vertical platform and the surface platform. Another risk is based on the requirement that a vertical platform be available to scan the region surrounding the surface platform when needed.

Thus, it may be appreciated that there is a need for a system that provides accurate imaging of objects through an obscuring medium, and for tracking moving objects through an obscuring medium even when the imaging platform itself is located within the obscuring medium.

SUMMARY OF THE INVENTION

The invention provides a system for detecting an object of interest through a medium which may obscure the object. The invention employs a reference object from which a reference signal emanates. One or more detectors sense or detect and transform the reference signal into a transformed reference signal, and further sense and transform object signals emanating from an object of interest into a transformed object signal. An image processor generates a corrected image signal by applying an inverse image transfer function to convolve the transformed object signal. Then a display presents a corrected image of the object of interest in response to receiving the corrected image signal.

The invention may also be characterized as a method for detecting an object of interest through a medium. The method includes the steps of: a) receiving a reference signal emanating from a reference object; b) receiving an object signal emanating from an object of interest; c) transforming the reference signal into a transformed reference signal; d) transforming the object signal into a transformed object signal; e) generating a corrected image signal from the transformed reference and object signals by applying an inverse image transfer function to convolve the transformed object signal; and f) displaying a corrected image of the object of interest in response to receiving the corrected image signal.

These and other advantages of the invention will become more apparent upon review of the accompanying drawings and specification, including the claims.

BRIEF DESCRIPTION OF THE DRAWINGS

Throughout the several views, like elements are referenced using like references.

DESCRIPTION OF THE PREFERRED EMBODIMENT

Figure 1:
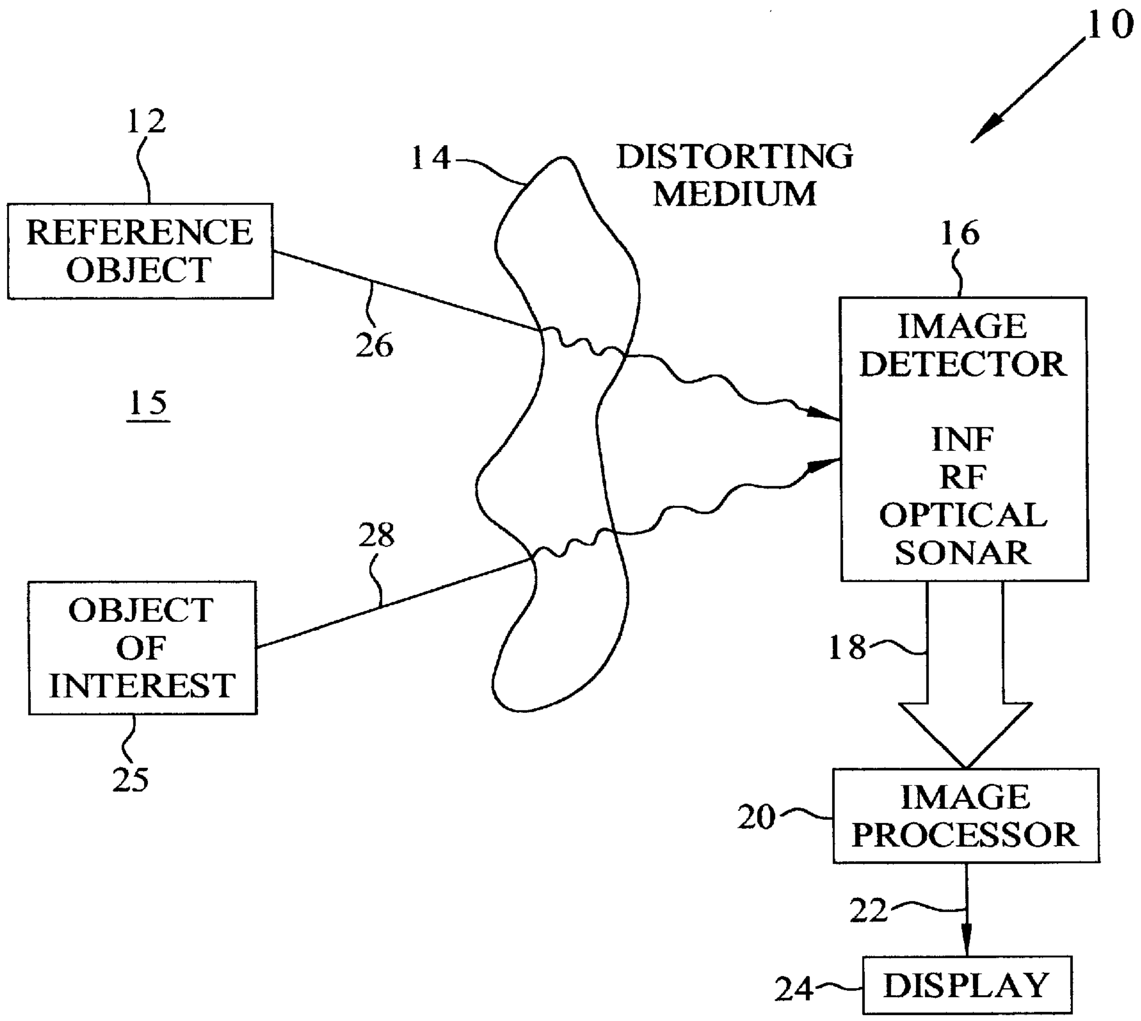
FIG. 1 illustrates a system for detecting moving objects through an obscuring medium embodying various features of the present invention.

Referring to FIG. 1, the present invention is directed to a system 10 for detecting objects through an obscuring region 14 of a medium 15 by comparing a background scene of interest with an image of a reference object. Medium 15 may, for example, be the atmosphere or the ocean. System 10 includes an image detector 16, image processor 20 and a display 24. Energy signal 28 emanating from an object of interest 25 and which may be obscured by obscuring region 14 is detected by image detector 16. For example, energy signal 28 may be radiated, reradiated, or scattered from object of interest 25. Object of interest 25 may be moving or stationary with respect to image detector 16. Similarly, energy signal 26 emanating from a reference object 12 and which may be obscured through obscuring region 14 is also detected by image detector 16. For example, energy signal 26 may be radiated, reradiated, or scattered from reference object 12. Image detector 16 transforms energy signals 26 and 28 into transformed signals comprising digital signal 18 representing the images of reference object 12 and object of interest 25. The image processor 20 employs the true or undistorted image of reference object 12 and the representation of reference object 12 encoded in signal 18 to reduce or correct for the image obscuring affects of obscuring region 14 on the representation of object of interest 25 encoded in signal 18. Image processor 20 then provides corrected image signal 22 which is presented by display 24 into a "corrected" image of object of interest 25 that has eliminated or reduced some or all of the obscuring effects of obscuring region 14. By way of example, energy signals 26 and 28 may be ionizing or non-ionizing radiation selected from the group that includes, but is not limited to: a) optical radiation; b) infrared radiation; c) x-ray radiation; d) ultraviolet radiation; and e) radio frequency radiation. Alternatively, energy signals 26 and 28 may also be acoustic energy signals. When implemented as an optical detector, image detector 16 may be a charge coupled device (CCD) array, charge injection device (CID), or an array of photo detectors such as photo diodes and photo transistors. Image detector 16 may be implemented as an amplified camera. Additionally, image detector 16 may be an analog device in which case, an A/D converter (not shown) would be employed to transform analog signals into digital signal 18. It is to be understood that non-ionizing radiation includes polarized radiation.

Reference object 12 may be a physical or virtual object. An example of a physical reference object is a remote piloted vehicle such as a model airplane or balloon. Physical reference objects have shapes which do not vary during the time interval in which reference images are acquired. A virtual reference object, however, is temporal. Therefore, virtual reference objects may need to be regenerated. Examples of virtual reference objects include, but are not limited to, gas bubbles, an explosion, water vapor clouds, and a laser guide star. Possible reference signatures may include: a) ionizing radiation such as ultraviolet light, X-rays, and particles; and 2) non-ionizing radiation such as acoustic, light energy, infrared, and radio energy. Other signatures may include: a) chemical or biological markers; b) electrical, magnetic, or gravitational fields; and c) thermal energy.

When medium 15 is the atmosphere, obscuring region 14 may result from the obscuring effects of the type found at the air/sea interface, or from atmospheric turbulence. When medium 15 is the ocean, obscuring region 14 may result from isoclines, the sea/air interface, and the sea/bottom interface. Obscuring effects may also result from the motion of an unknown object or the detection system. The operation of system 10 assumes that radiation signals 26 and 28 both are obscured by obscuring region 14 in a functionally equivalent manner. That is, for the time period within which radiation signals 25 and 28 are acquired, the signals experience similar aberration, scattering, and absorption effects.

Figure 2:
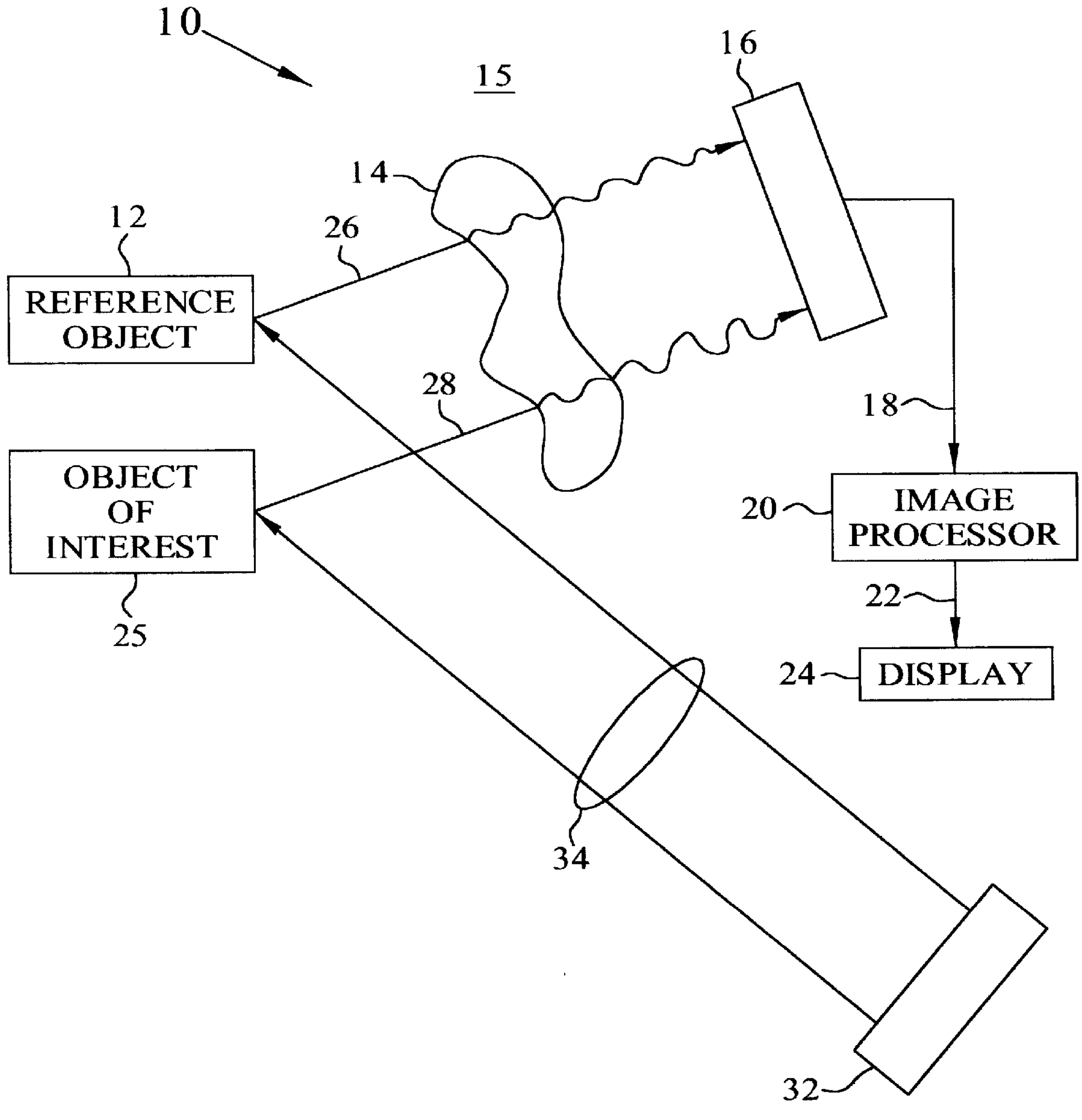
FIG. 2 illustrates a second embodiment of a system for detecting moving objects through an obscuring medium.

In FIG. 2, there is shown another embodiment of the present invention which further includes a radiation source 32 for generating radiation signals 34. Radiation signals 34 may, for example, propagate the same types of energy described above with reference to signals 26 and 28, and be used to illuminate reference object 12 and object of interest 25. When radiation signals 34 scatter off reference object 12 and object of interest 25, they are transformed into radiation signals 26 and 28, respectively. Signals 26 and 28 become distorted as they propagate through obscuring region 14. Detector 16 detects the distorted signals 26 and 28. However, image processor 20 applies information about the true or undistorted image of reference object 12 to the detected distorted image of reference object 12 to derive an image transfer function whose inverse then is applied to the image of object of interest 25 to reduce or eliminate the distortion in signal 28. Image processor 20 generates a corrected image signal 22 that preferably is provided to display 24 for presentation to a human observer. Both man-made and naturally occuring radiation source may be used in conjunction with the present invention.

There are many signal processing techniques, or transfer functions which may be incorporated into an algorithm that is processed by image processor 20 to remove or reduce the distortion from the detected image of object of interest 25. By way of example, let the image transfer function specific to the effect of obscuring region 14 on signals 26 and 28 be called f(x,y). The image transfer function f(x,y) may model effects such as absorption, scatter, multipath, distortion, and boundary effects. Thus, even if object of interest 25 was a point source, signal 28 may exhibit a time dependence. Let the detected degraded signal 28 be h(x,y) and the true or undistorted reference signal 26 be represented by g(x,y), and let (u,v) and (x,y) represent spatial coordinates in the image plane in applications where image detector 20 is a two dimensional detector array. In this example, the z or depth dimension is assumed to be constant for reference object 12 and object of interest 25. If depth dependence is present, a series of three dimensional reference object signals $g(x_i, y_j, z_k)$ may be acquired to suit the needs of a particular application, where i,j, and k represent indices of variables with coordinates in an X-Y-Z reference system. The representation of the corrected image in signal 22 from degraded signal 28 is result of the convolution of the image transfer function with the degraded reference signal 26, where:

$$h(x, y) = f * g = \int_{-\infty}^{\infty}\int_{-\infty}^{\infty} f(u, v)g(x-u, y-v)du dv.$$

For the discrete case, the digital two dimensional (m×n) convolution may be written as:

$$H(i, j) = F * G = \sum_{m}\sum_{n} F(m, n)G(i-m, j-n),$$

where m and n are positive integers.

If desired, F may be determined by deconvolving H(i,j). Thus, $H*G^{-1}=F$. Due to potential instabilities, a number of deconvolution methods may be implemented such as Wiener, Power Spectrum Equalization, Geometrical Mean, etc. Blind deconvolution methods may also be employed, as required to suit the needs of a particular application. The function H(i,j) is dynamically determined by image processor 20 in response to changing conditions of obscuring region 14. By way of example, image processor 20 may be a dedicated processor or a work station personal computer. Image processor 20 determines the inverse transform function of F, i.e., $F^{-1}$. The inverse transfer function $F^{-1}$ then is convolved with the distorted image signal H representing the unknown object to obtain the corrected image signal G in accordance with the following equation: $F^{-1}*H=G$.

The detection of an unknown object can be affected by factors such as the detector observation direction and incident angle of the illuminating radiation. In some cases, a particular observation angle may result in a severely distorted signal or a signal with high scatter content or even a blocked signal. A change in view angle may significantly affect detection probability. For example, the geometry and material which comprise an unknown object may be designed to minimize scatter over a range of radiation wavelengths and incident angles. Therefore, the use of multiple detectors with or without multiple illuminating sources may be employed to significantly improve the probability of detection of an unknown object.

Figure 3:
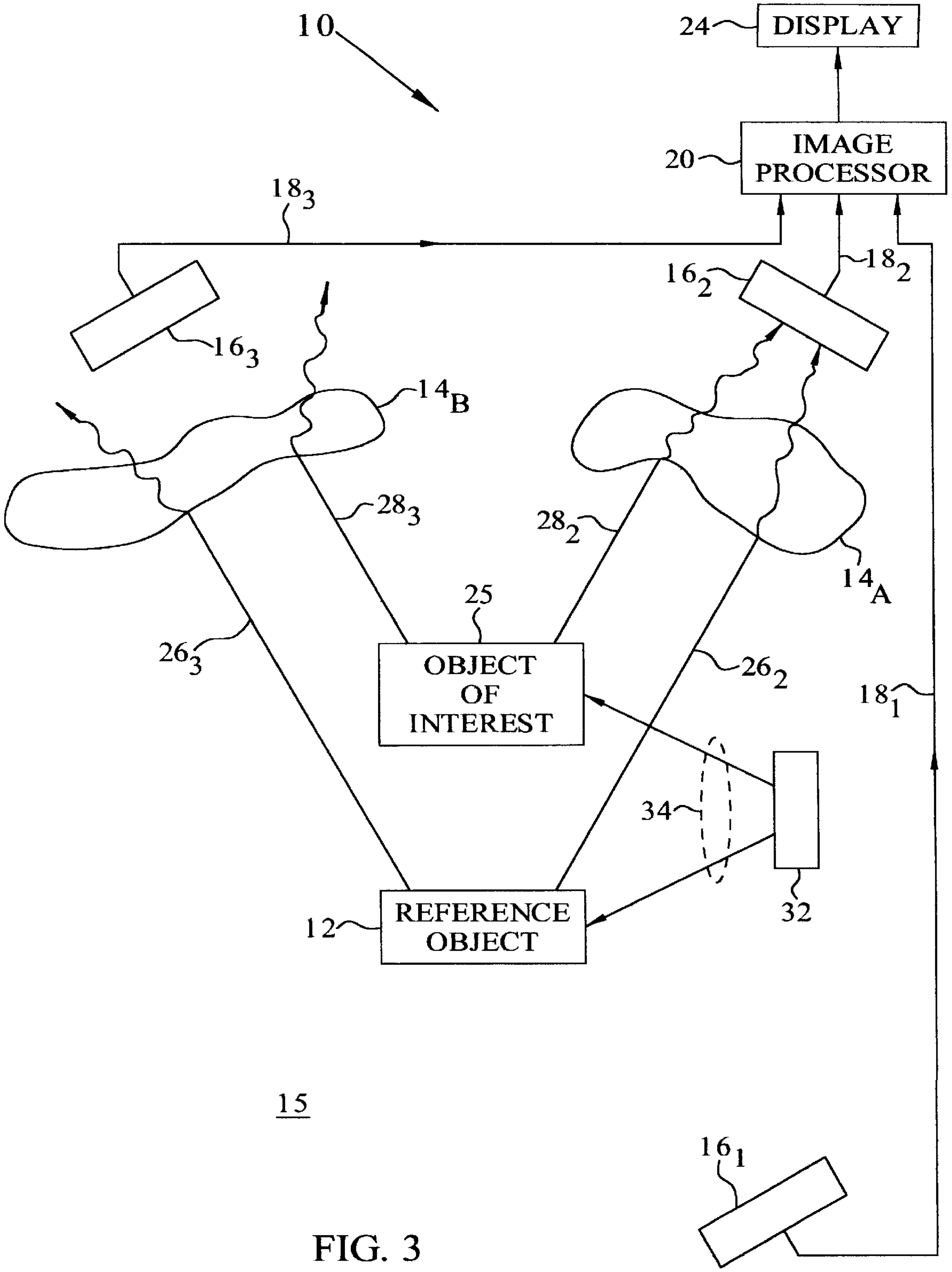
FIG. 3 illustrates a system for detecting moving objects through an obscuring medium that employs multiple detectors.

FIG. 3 illustrates an example of system 10 that uses multiple image detectors $\mathbf{16}_i$ which may be distributed in a suitable three dimensional configuration, where i is a positive integer representing an index. In FIG. 3, radiation source 32 generates radiation signals 34 that illuminate reference object 12 and object of interest 25. Radiation signals 34 are transformed into signals $\mathbf{26}_i$ and $\mathbf{28}_i$ that emanate from reference object 12 and object of interest 25, respectively. Object of interest 25 affects radiation signals 34 whereby signals $\mathbf{28}_2$ and $\mathbf{28}_3$ emanate from the object of interest. Reference object 12 affects radiation signals 34 whereby signals $\mathbf{26}_2$ and $\mathbf{26}_3$ emanate from the reference object. In the example presented in FIG. 3: a) obscuring region $\mathbf{14}_A$ distorts signals $\mathbf{26}_2$ and $\mathbf{28}_2$ before being sensed by detector $\mathbf{16}_2$; and b) obscuring region $\mathbf{14}_B$ distorts signals $\mathbf{26}_3$ and $\mathbf{28}_3$. However, signals $\mathbf{26}_3$ and $\mathbf{28}_3$ are not received by detector array $\mathbf{16}_3$. Moreover, in the example of system 10 described with reference to FIG. 3, no signals are re-radiated or scattered from reference object 12 or object of interest 25 in the direction of detector array $\mathbf{16}_1$. Image processor 20 processes transformed signals $\mathbf{18}_2$ as described above, whereupon a corrected image of object of interest 25 is presented by display 24. Thus, it may be appreciated that the use of multiple detectors $\mathbf{16}_i$ enhances the probability of detecting object of interest 25.

The example of system 10 illustrated in FIG. 3 uses three detector arrays $\mathbf{16}_i$ and is presented by way of example only. It is to be understood that the scope of system 10 includes the use of any number of detector arrays required to suit the needs of a particular application. Illuminating sources such as radiating source 32 and image detector 16 may be operated in monostatic and mulitstatic imaging modes. Although data from multiple detectors $\mathbf{16}_i$ may be evaluated independently, techniques such as tomosynthesis may be implemented in image processor 20 to improve image quality.

Obviously, many modifications and variations of the present invention are possible in light of the above teachings. For example, an alternative to deconvolving the detected images is to use pattern recognition and compare the detected images against a known reference image. Other alternatives to deconvolving the detected images is to use adaptive optics or acoustics to correct the distorted wave front from a source, or to distort an illuminating wavefront to compensate for propagation effects. It is therefore to be understood that within the scope of the appended claims, the invention may be practiced otherwise than as specifically described.

I claim:

1. A system for detecting an object of interest through a medium, comprising:

a reference object from which a reference signal emanates:

a detector for detecting and transforming said reference signal into a transformed reference signal and for detecting and transforming an object signal emanating from an object of interest into a transformed object signal;

an image processor for determining an image transform function from said transformed reference signal and undistorted image information about said reference object, and applying said image transform function to said transformed object signal to generate a corrected image signal; and a display for presenting a corrected image of said object of interest in response to receiving said corrected image signal.

2. The system of claim 1 where in said object signal is scattered from said object of interest.

3. The system of claim 1 wherein said detector is an ionizing radiation detector.

4. The system of claim 3 wherein said ionizing radiation detector is selected from the group that includes ultraviolet, X-ray, and particle detectors.

5. The system of claim 1 wherein said detector is a non-ionizing radiation detector.

6. The system of claim 5 wherein said detector is selected from the group that includes infrared, radio frequency, and optical detectors.

7. The system of claim 1 wherein said detector is an acoustic detector.

8. The system of claim 1 where in said object signal radiates from said object of interest.

9. A method for detecting an object of interest through a medium, comprising the steps of:

receiving a reference signal emanating from a reference object;

receiving an object signal emanating from an object of interest;

transforming said reference signal into a transformed reference signal;

transforming said object signal into a transformed object signal;

determining an image transform function from said transformed reference signal and undistorted image information about said reference object;

applying said image transform function to said transformed object signal for generating a corrected image signal; and displaying a corrected image of said object of interest in response to receiving said corrected image signal.

10. The method of claim 9 further including the step of irradiating said reference object and object of interest to produce said reference signal and object signal, respectively.

11. A system for detecting an object of interest through an obscuring medium, comprising:

a radiation source for generating an interrogation signal which is transformed by an object of interest into an image signal;

a reference object which transforms said interrogation signal into a reference signal;

a detector for detecting and transforming said reference signal into a transformed reference signal and for detecting and transforming an object signal emanating from an object of interest into a transformed object signal;

an image processor for determining an image transform function from said transformed reference signal and undistorted image information about said reference object, and applying said image transform function to said transformed object signal to generate a corrected image signal; and a display for presenting a corrected image of said object of interest in response to receiving said corrected image signal.

12. The system of claim 11 wherein said detector is an ionizing radiation detector.

13. The system of claim 12 wherein said ionizing radiation detector is selected from the group that includes ultraviolet, X-ray, and particle detectors.

14. The system of claim 10 wherein said detector is a non-ionizing radiation detector.

15. The system of claim 14 wherein said detector is selected from the group that includes acoustic, infrared, radio frequency, and optical detectors.

16. A system for detecting an object of interest through a medium, comprising:

a reference object from which a reference signal emanates:

multiple detectors for detecting and transforming said reference signal into a transformed reference signal and for detecting and transforming an object signal emanating from an object of interest into a transformed object signal;

an image processor for determining an image transform function from said transformed reference signal and undistorted image information about said reference object, and applying said image transform function to said transformed object signal to generate a corrected image signal; and a display for presenting a corrected image of said object of interest in response to receiving said corrected image signal.

17. The system of claim 16 wherein image processor generates said corrected image signal by applying an inverse image transfer function to convolve said transformed object signal.

* * * * *